July 28, 1925.

J. L. SOLOMON

CONE WASHER

Filed Dec. 2, 1924

1,547,971

J. L. Solomon,
Inventor

By C. A. Snow & Co
Attorneys

Patented July 28, 1925.

1,547,971

UNITED STATES PATENT OFFICE.

JAMES L. SOLOMON, OF SPRINGFIELD, MISSOURI.

CONE WASHER.

Application filed December 2, 1924. Serial No. 753,487.

*To all whom it may concern:*

Be it known that I, JAMES L. SOLOMON, a citizen of the United States, residing at Springfield, in the county of Greene and State of Missouri, have invented a new and useful Cone Washer, of which the following is a specification.

This invention aims to provide a novel form of washer, whereby wear can be taken up between a nut and an object wherewith the nut ordinarily cooperates.

It is within the province of the disclosure to improve generally and to enhance the utility of devices of that type to which the invention appertains.

Although a preferred form of the invention has been disclosed, it will be understood that a mechanic, working within the scope of what is claimed, may make changes in the precise form shown, without departing from the spirit of the invention.

In the accompanying drawings:—

Figure 3:
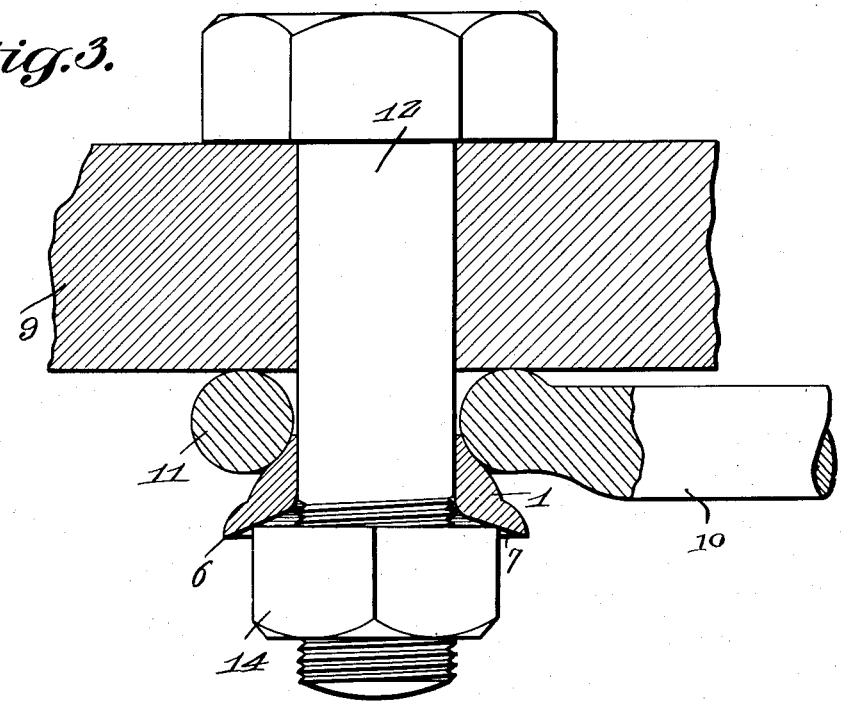
Figure 1:
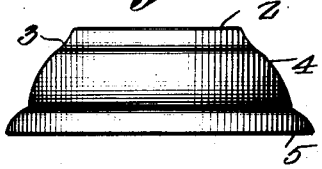
Figure 2:
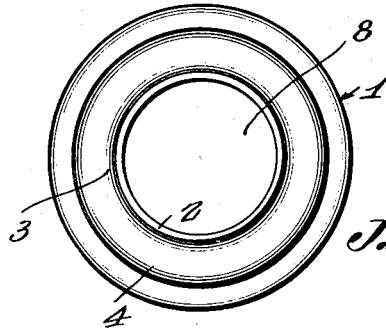

Figure 1 shows, in side elevation, a washer constructed in accordance with the invention; Figure 2 is an end elevation of the washer; Figure 3 is a sectional view illustrating one use to which the washer may be put.

The washer forming the subject matter of this application is made of metal, and comprises a body 1 of conical form, provided at its smaller end 2 with a circumferential concaved recess 3, the washer being equipped, to the rear of the recess, with a circumferential convexed shoulder 4, the washer being supplied, at its wider end 5, with an outstanding circumferential flange 6, there being an internal conical seat in the flange, the seat being designated by the numeral 7, and the body 1 having a bore 2 communicating with the smaller end of the seat 7.

The washer above described may be used for many purposes, to take up wear, but, in Figure 3, the washer has been shown as used in connection with a part of an automobile construction. In Figure 3, the front axle of an automobile is designated by the numeral 9, and one of the radius rods is shown at 10, the rod 10 having an eye, which is of circular cross section, as Figure 3 will show. A bolt 12, passes through the eye 11 of the radius rod and through the axle 9, a nut 14 being threaded on the bolt.

In the event that it is desired to take up wear between the bolt 12 and the eye 11, the washer is interposed between the nut and the eye, as shown in Figure 3. Under such circumstances, the eye 11 fits in the concaved recess 3 of the washer and is held therein by the shoulder 4. The flange 6 shields the nut 14, the nut being received in the seat 7.

I claim:—

A washer of the class described comprising a body of conical form, provided at its smaller end with a circumferential concaved recess, the washer being equipped to the rear of the recess, with a circumferential convexed shoulder, the washer being supplied, at its wider end, with an outstanding circumferential flange, there being an internal conical seat in the flange, and the body having a bore communicating with the smaller end of the seat.

In testimony that I claim the foregoing as my own, I have hereto affixed my signature in the presence of two witnesses.

JAMES L. SOLOMON.

Witnesses:
FRANCES E. CHINN,
Mrs. R. C. REAMES.